United States Patent [19]
Dabolt

[11] Patent Number: 5,181,480
[45] Date of Patent: Jan. 26, 1993

[54] LITTER-BOX AND LITTER DISPENSING HOPPER

[76] Inventor: Sheila Dabolt, 26502 Calle San Francisco, San Juan Capistrano, Calif. 92675

[21] Appl. No.: 806,209

[22] Filed: Dec. 13, 1991

[51] Int. Cl.$^5$ .................. A01K 1/00; A01K 29/00
[52] U.S. Cl. ..................... 119/165; 119/161
[58] Field of Search ............ 119/165, 164, 163, 161, 119/166, 167, 168

[56] References Cited

U.S. PATENT DOCUMENTS

| | | | |
|---|---|---|---|
| 3,100,474 | 8/1963 | Schneider | 119/166 |
| 3,793,989 | 2/1974 | Clark | 119/165 |
| 3,796,188 | 3/1974 | Bradstreet | 119/166 |
| 3,908,597 | 9/1975 | Taylor | 119/166 |
| 3,954,086 | 5/1976 | Maness | 119/168 |
| 4,117,804 | 10/1978 | Moore et al. | 119/166 |
| 4,493,288 | 1/1985 | van der Kolk | 119/166 |
| 4,844,011 | 7/1989 | Strickland | 119/164 |
| 5,003,920 | 4/1991 | Miksitz | 119/163 |

FOREIGN PATENT DOCUMENTS

| | | | |
|---|---|---|---|
| 1198638 | 12/1985 | Canada | 119/165 |
| 3243697 | 5/1984 | Fed. Rep. of Germany | 119/156 |

*Primary Examiner*—John G. Weiss
*Attorney, Agent, or Firm*—Emrich & Dithmar

[57] ABSTRACT

An animal litter-box includes a bed adapted to receive and store litter and manually retractable floor sections above the bed. A litter refuse container with a refuse bag holder is located beneath the floor. As the floor sections are retracted manually to transfer litter from the floor to the bed, the floor sections are cleaned by the action of scrapers in the bed which remove soiled litter from the upper surface of the floor sections and direct the soiled litter into the refuse container below. A portable litter hopper is adapted for disposal adjacent the litter-box for metering clean litter into the bed. The hopper includes a lid and an interior having four separated compartments. The litter is dispensed through a removable gate having manually rotatable inner and outer disks which each have a dispensing aperture. A compartment is selected by aligning the aperture of the inner disk with the selected compartment, and the gate is opened, for dispensing litter by gravity from a selected compartment, by rotating the outer disk until its aperture aligns with the dispensing aperture on the inner compartment. The gate is closed by rotating the outer disk out of register with the inner disk. The hopper may be filled conveniently by setting the hopper on its back and filling the compartments through the gate after it is removed.

19 Claims, 2 Drawing Sheets

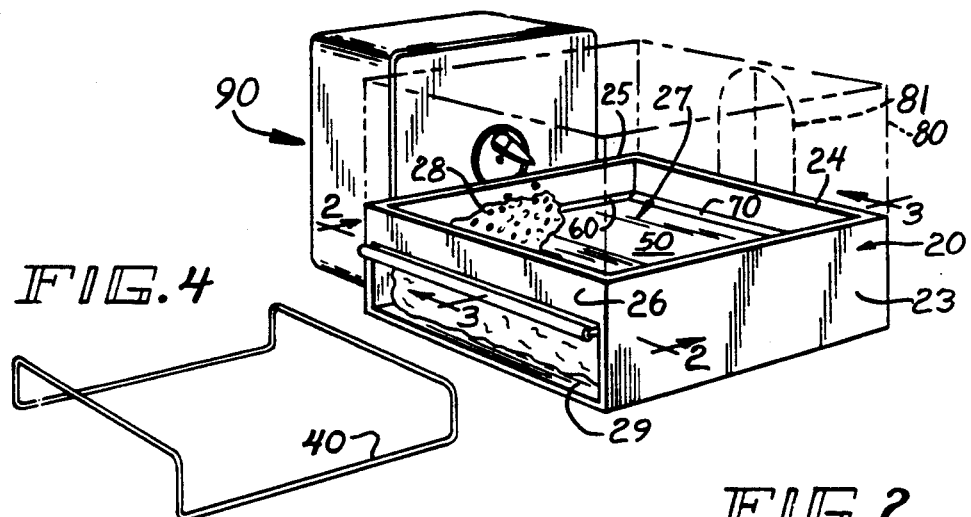
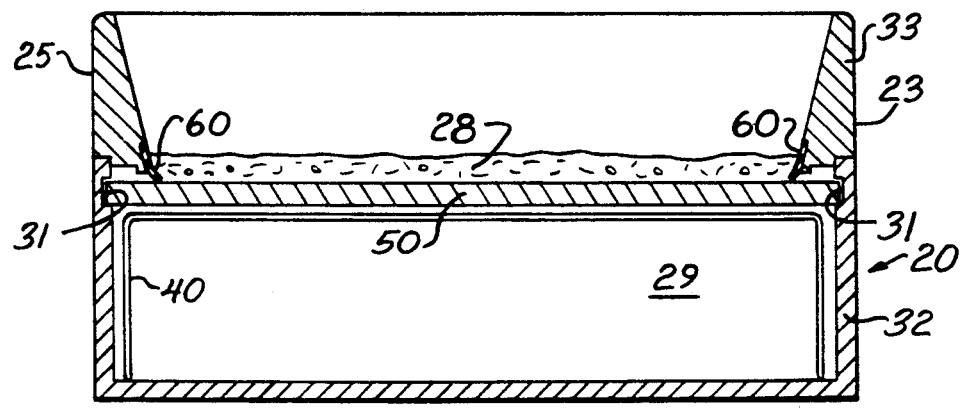
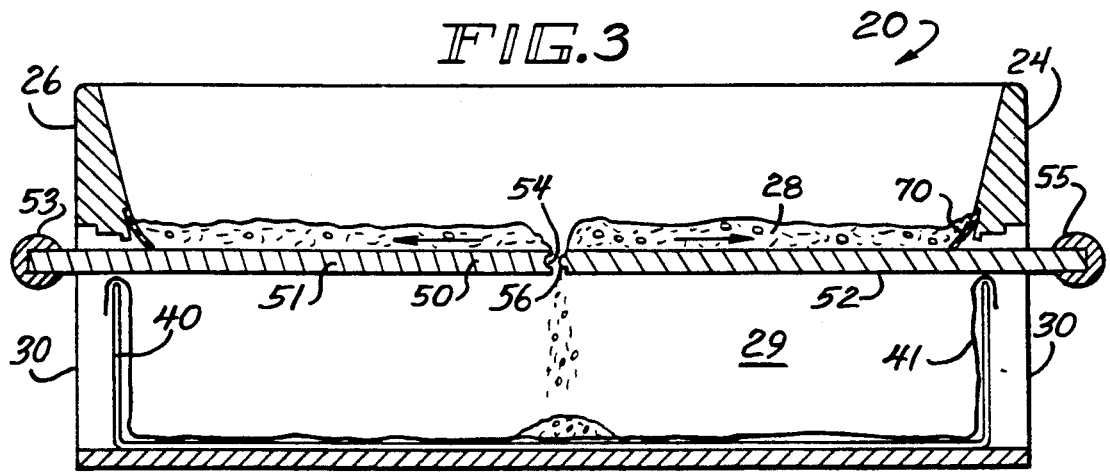

5,181,480

LITTER-BOX AND LITTER DISPENSING HOPPER

FIELD OF THE INVENTION

The present invention relates to a combination including a litter-box and dispensing storage hopper for the litter.

BACKGROUND OF THE INVENTION

For a number of years, the use of sand or pre-prepared litter for domestic pets has been recognized as a partial solution to the problem of maintaining a household pet while providing some toilet facilities for the pet. Cats, being relatively clean animals, and dogs, being easily trained, can be provided with a litter-box in which they will perform their natural functions.

However, the problem of sanitation and, more particularly the disposal of soiled litter in the litter-box, has not been fully solved to date by prior art litter-boxes.

Further, the problems associated with the storage and dispensing of clean litter into the litter-box, such as the unmanageability of the litter bags and the spillage of litter as it is dispensed into the litter-box, leave substantial room for improvement, particularly for those who find it difficult to lift a large bag of litter to replace soiled litter.

SUMMARY OF THE INVENTION

The present invention contemplates a litter-box which automatically bags and disposes of soiled litter easily, cleanly, conveniently, and expediently, and a litter dispensing and storage hopper which provides for convenient storage and easy manageability and dispensing of measured quantities of clean litter into the litter-box conveniently and without spillage.

According to the present invention, a litter-box includes a bed adapted to receive and store litter, a plurality of interconnected upstanding side walls, and a litter refuse container beneath the bed. A refuse holder containing a bag is disposed within the litter refuse container beneath a floor which includes two mating half sections which are manually retractable in opposite directions from opposite side walls of the bed. A scraper is secured to each of the side walls which are perpendicular to the direction of retraction of the floor halves. The scraper engages the upper surface of each of the floor sections for scraping and removing soiled litter from the upper surface into an open refuse bag held as the floor halves are retracted.

A portable litter dispensing hopper is adapted to be disposed adjacent one of the side walls of the litter-box for dispensing litter over the side wall and onto the floor in the bed of the litter-box. The dispensing hopper includes a bottom wall or back and a plurality of interior compartments for storing measured quantities of litter. The hopper is adapted to stand on one of the side walls for dispensing litter into the bed. It may be set on its back for filling. The dispensing hopper includes a lid for preventing spillage of the litter from the compartments, and a gate is removably mounted in a central opening in the lid.

The gate includes rotatable inner and outer disks, each having a circular dispensing aperture. For dispensing, the hopper is moved so that a full storage compartment is in the top position, and the inner disk is rotated so that its dispensing aperture aligns with the apex of that compartment. The outer disk is then rotated until its discharge aperture aligns with the aperture o the inner disk.

Litter is dispensed through the aligned apertures under gravity from the selected compartment over the side wall and onto the floor in the bed. When the outer disk is rotated to a second position, the outer disk closes off the dispensing aperture in the inner disk so that litter is not dispensed from the selected compartment.

The features and advantages of the present invention will be more fully appreciated after a better understanding of the invention is obtained from the attached drawing wherein identical reference numerals refer to like parts in the various views.

BRIEF DESCRIPTION OF THE DRAWINGS

FIG. 1 is a perspective view of a litter-box and litter dispensing hopper constructed in accordance with the teachings of the present invention, with a removable enclosure shown in phantom;

FIG. 2 is a vertical cross-sectional view of the litter-box taken along the line 2—2 of FIG. 1;

FIG. 3 is a vertical cross-sectional view of the litter-box taken along the line 3—3 of FIG. 1;

FIG. 4 is a perspective view of the refuse bag holder adapted to be disposed in the litter-box;

DETAILED DESCRIPTION OF THE PREFERRED EMBODIMENT

Figure 5:
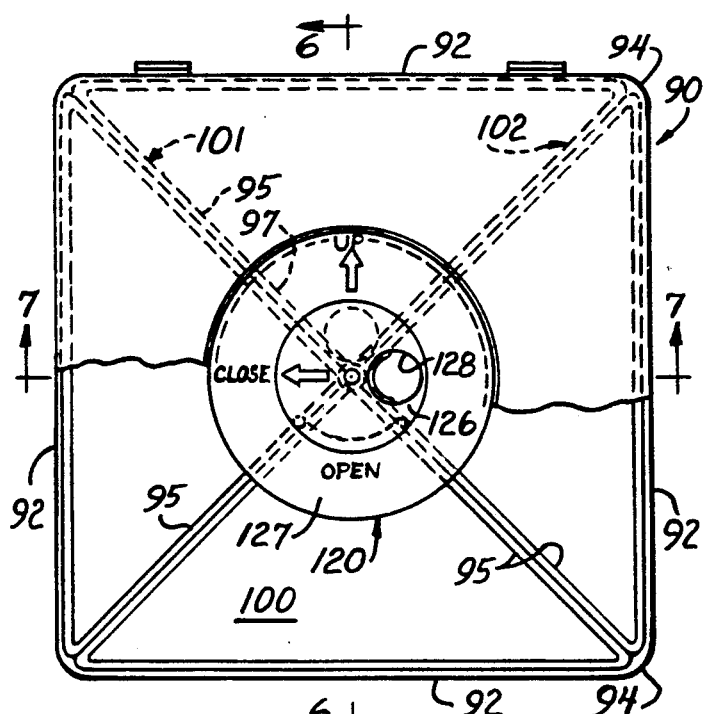
FIG. 5 is a partially fragmentary front elevation view of the litter dispensing hopper.

Referring to FIGS. 1-3, there is depicted a litter-box generally designated 20 embodying the features of the present invention. The litter-box 20 includes four side walls 23-26 forming a generally square box which defines a bed 27, and a litter refuse container 29 beneath the bed 27. The bed 27 is adapted for receiving and storing litter 28; and it is sized and constructed to accommodate and hold a pet, of course.

Opposing side walls 24 and 26 have an opening 30 to allow insertion and removal of a wire-frame bag holder 40 (FIGS. 2-4) adapted to receive a refuse bag 41 (FIG. 3) and hold it in an open position. Opposing side walls 23 and 25 have a longitudinally extending slider groove 31 (FIG. 2) for receiving a floor 50 (FIGS. 1-3) which partially defines the bed 27. Referring to FIG. 3, the floor 50 includes mating floor sections or halves 51 and 52. Floor section 51 has a handle 53 at one end and a groove 54 at the other end while the floor section 52 has handle 55 at one end and a tongue 56 at the other end which mates with the groove 54 to seal the center of the floor and to prevent the floor sections from sagging.

Referring to FIGS. 1 and 2, an elongate flexible rubber sealing strip 60 is adhesively secured to the inner surface of each of the side walls 23 and 25 and is placed in contact with the upper surface of each of the floor halves 51 and 52. Referring to FIGS. 1 and 3, an elongate flexible curved metal or plastic scraper 70 is adhesively mounted to the inner surface of each of the side walls 24 and 26 and is placed in contact with the upper surface of each of the floor halves 51 and 52.

For ease of manufacture and assembly, the litter-box 20 may be formed from two adhesive bonded members 32 and 33 (FIG. 2).

According to the invention, the floor sections 51 and 52 are manually retractable horizontally away from each other in the direction of the arrows shown in FIG. 3. When the floor sections 51 and 52 are thus opened or separated, the upper surfaces are automatically cleaned of soiled litter by the scraping action of the scrapers 70 which remove the soiled litter from the floor sections 51 and 52 and direct it into the bag 41 below (FIG. 3). The sealing strips 60 prevent the soiled litter from escaping the scraping action upon retraction of the floor sections 51 and 52.

Once all of the soiled litter has been removed from the upper surface of the floor sections 51 and 52, the floor sections may be closed as shown in FIG. 1. The holder 40 can then be removed through either of the openings 30 to allow removal of the bag 41 with soiled litter and to allow insertion of a new bag. The floor sections 51, 52 may be completely removed, if desired, for further cleaning.

According to the invention, and as shown in phantom in FIG. 1, an enclosure 80 may be secured to the top of the litter-box 20 for aesthetic purposes and, more particularly, for containing odors. The enclosure 80 may include an access door 81 of suitable flexible material such as a plastic or the like, to allow entry and exit of a pet.

Referring to FIG. 1, the present invention further comprises a portable litter dispensing hopper generally designated 90 which is adapted to be disposed adjacent one of the side walls 23-26 of the litter-box 20 for dispensing clean litter onto the floor 50 in the bed 27 without having to lift the hopper.

Figure 6:
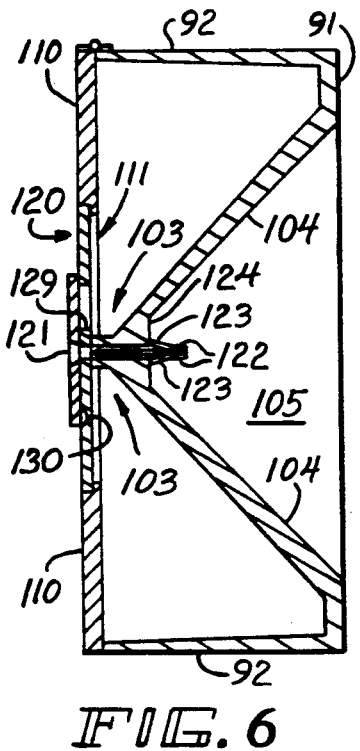
FIG. 6 is a cross-sectional view taken along the line 6—6 of FIG. 5.
Figure 7:
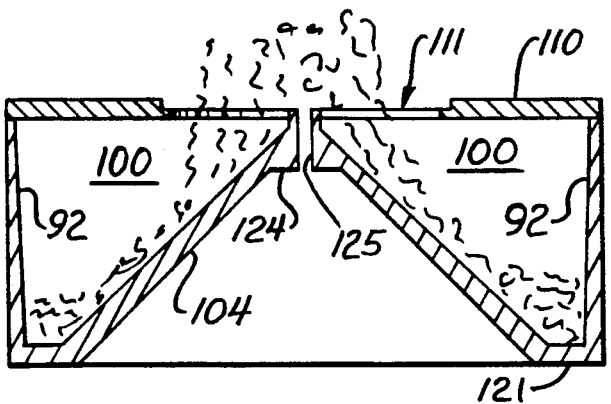
FIG. 7 is a cross-sectional view taken along the line 7—7 of FIG. 5 with the gate removed for filling.

Referring to FIGS. 5-7, the hopper 90 includes a bottom wall 91 and four interconnected side walls 92 forming an interior. The hopper 90 includes rounded corners 94 which allow the hopper 90 to be rolled on its side walls 92 thus alleviating the need for picking up the hopper 90 for dispensing purposes. Interior dividers 95 fit in the hopper body to divide the interior into four generally triangular compartments 100 of equal size so that when they are filled, each contains a measured quantity of clean litter. It is understood that different materials may be stored and dispensed from each of the triangular compartments 100. Each of the dividers has a sharp upper edge, all of which abut the inner surface of a cover or lid 110 so that litter can not flow from one compartment to the other. Further, each of the compartments 100 have an apex 103 located adjacent the center of the interior of the hopper 90 which is the bottom of a compartment when that compartment is at the top side of the hopper.

Each of the compartments 100 thus has a pair of generally V-shaped sides such as those designated 101 and 102 in FIG. 5 defined by the dividers 95 and an inclined bottom or backwall (see 104 in FIG. 6) for funneling litter toward the apex 103. The bottom wall 104 is inclined at approximately a 45° angle from the peripheral bottom wall 91. The bottom walls 104 of each of the compartments 100 define a central access cavity 105 in the bottom of hopper 90. It is understood that there may be more than four compartments (and a corresponding number of side walls) because dividing the interior into more than four compartments will result in compartments having steeper sides and slightly faster dispensing times.

Referring to FIGS. 6 and 7, the hopper 90 also includes a lid 110 for preventing spillage of the litter from the compartments 100. The lid 110 has a central circular opening 111. The edges 97 on the dividers 95, which are preferably sharp, contact the inner surface of the lid 110 and prevent wedging of litter between the lid 110 and the compartments 100.

Additionally, and referring to FIGS. 5 and 6, the hopper 90 includes a gate 120 secured to the center of the hopper 90, by means of a pivot in the form of a locking pin 121. Pin 121 has a pair of legs 122, each having a barb 123 for engaging a flat center section 124 of the back wall of the hopper. The pin 112 is received in the cylindrical bore 125 in the hopper. The gate 120 closes the aperture 111 in the lid 110.

Figure 8:
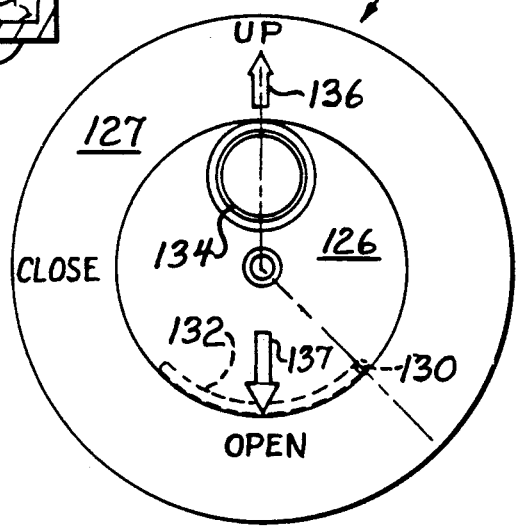
FIG. 8 is a front close-up view of the gate of the litter dispensing hopper shown in FIG. 7.

The gate 120 includes adjacent, concentric outer and inner disks, 126 and 127. The inner disk 127 is larger and has a circular dispensing aperture 129, a central aperture for pivot pin 121, and a semi-circular groove 132 (FIG. 8). The smaller outer disk 126 has a circular dispensing aperture 128, a central aperture for receiving pivot pin 112, and a boss 130 which rides in the groove 132 when the disks are disposed concentrically and adjacent to each other as shown in FIGS. 6 and 8. The outer disk 126 may include a spout 134 which may be fitted around the dispensing aperture 128. The disks 126 and 127 may be made of a transparent plastic material so that an observer may determine whether a selected compartment contains litter.

The opening 111 is used to fill the compartments 100 within the hopper. This is accomplished by placing the hopper on its side as seen in FIG. 6, when it is empty, and reaching into the cavity 105 in the back wall of the hopper and pinching the legs 122 of the locking pin 121 together so that the barbs 123 clear wall section 124 and fit within the aperture 125. Thus, the lock pin 121 and gate 120 may be removed so that the aperture 111 is opened. The hopper is then placed on its back to rest on the peripheral back wall 91 as seen in FIG. 7, and litter from a larger source such as a bag may be poured into the opening 111 to fill the compartments, the inclined walls 104 acting to direct the material from the center to fill the compartments 100. The gate may then be replaced by inserting the legs 122 of the locking pin into the aperture 125 and forcing the gate and locking pin downwardly.

In the illustrated embodiment, the lid 110 is secured to the side walls 92 of the hopper permanently as by staking or ultrasonic welding. Alternatively, the hinge 110 might be hinged to one of the side walls in which case the locking pin could take the form of a more conventional threaded fastener or screw. Further, the size of the opening 111 in lid 110 is not critical, but by way of example, if the sides of the hopper form a generally square shape and have a length of approximately 16 inches, then the inner diameter of the opening 111 may be 10 inches, and the counterbore for receiving the outer edge of inner disk 127 may be $\frac{1}{4}$ inch.

In operation, the selection of a compartment 100 from which litter is to be dispensed is made by first rotating (i.e., rolling) the hopper 90 on its side walls 92 to position a full compartment 100 at the top, with the hopper adjacent the litter-box 20 as shown in FIG. 1. The enclosure 80 is removed from the litter-box 20 for filling it.

When a full compartment is in the top position and the hopper is placed adjacent the litter-box as seen in FIG. 1, the inner disk 127 is rotated by hand until the arrow 136 points directly upwardly. This aligns the aperture 129 with the apex of the uppermost compartment 100. It will be observed that the inner disk 127 has the word "up" inscribed or printed above the arrow 136, and when the arrow 136 is properly placed at the 12 o'clock position, the word "CLOSE" is located at the 9 o'clock position on the inner disk 127, and the word "open" is placed at the 6 o'clock position. The purpose of these latter two indicia is to guide the user in manipulating the outer disk 126.

When it is desired to dispense, the outer disk 126 is rotated so that the arrow 137 points downwardly to the "open" indicia as seen in FIG. 8. The gate is closed when the outer disk 126 is rotated such that the arrow 137 is pointed to the "CLOSE" indicia.

When the gate 120 is opened, the litter will fall by gravity down the sides 101 and 102 and the inclined back wall 104 through the apertures 128, 129 and through spout 134 over the side wall 25 and into the bed 27 (FIG. 1). Preferably the bottom wall 104 of the compartments 100 is disposed at an angle approximately equal to the angle of repose for litter so that all of the litter will be dispensed when the gate 120 is opened. The spout allows the directional control of the litter into the bed and helps to carry it well into the litter-box 20 (FIG. 1).

Once all of the litter has been dispensed from the compartment 100, the gate 120 may be closed by rotating the outer disk ¼ turn clockwise to the "CLOSE" position so that the apertures 128, 129 are not in register. The semi-circular groove 132 in cooperation with the boss 130 riding therein limits the relative rotation of the two disks 126 and 127 between the "CLOSE" and "OPEN" positions.

Having thus disclosed in detail a preferred embodiment of the invention, persons skilled in the art will be able to modify certain of the structure which has been illustrated and to substitute equivalent elements for those disclosed while continuing the practice of the principle of the invention; and it is, therefore, intended that all such modifications and substitutions be covered as they are embraced within the spirit and scope of the appended claims.

I claim:

1. In combination, a pet litter-box comprising a bed adapted to receive and store litter and a plurality of interconnected upstanding side walls; a flexible, disposable litter refuse container beneath said bed; and a portably, free-standing litter dispensing hopper having an upright front wall with a central dispensing aperture and a horizontal side wall upon which said hopper may be set remote from said litter box for storage or disposed adjacent said litter box for dispensing litter over sad upstanding side wall and onto said bed of said litter-box, said litter-box further comprising: a floor having a manually retractable section at least partially defining said bed and covering said refuse container; and means attached to one of said side walls for removing litter from the upper surface of said retractable section into said refuse container when said section is retracted.

2. The apparatus of claim 1, wherein said removing means comprises an elongate curved scraper secured to one of said bed side walls extending transversely to the direction of retraction of said floor, said scraper being disposed against the upper surface of said floor for scraping the litter from said upper surface of said retractable section when said section is retracted.

3. The apparatus of claim 1, wherein said floor is comprised of mating sections, said sections being retractable in opposite directions from opposite side walls of said bed whereby said litter falls through the center of said floor when said sections are retracted.

4. The apparatus of claim 3, wherein said removing means comprises an elongate curved scraper secured to each of said opposite side walls, each of said scrapers being disposed against the upper surface of each of said sections of said floor for scraping the litter from said sections when said sections are retracted.

5. The apparatus of claim 4, wherein one of said sections has a mating end with a groove and the other of said sections has a mating end with a tongue to seal the abutting edges and to strengthen said edges from sagging.

6. The apparatus of claim 1, wherein said refuse container includes a holder for a refuse bag, said refuse container having an opening to allow insertion and removal of said holder.

7. The apparatus of claim 1, further comprising an elongate sealing strip secured to each of said opposite bed side walls extending parallel to the direction of retraction of said floor, each strip being disposed against said upper surface of said floor to prevent the litter from escaping said removing means upon retraction of said floor.

8. The apparatus of claim 1, further comprising a removable enclosure securable to the bed and including an access door to allow entry and exit of a pet.

9. In combination, a pet litter-box comprising a bed adapted to receive and store litter and a plurality of interconnected upstanding side walls; and a portable litter dispensing hopper adapted to be disposed adjacent one of said side walls of said litter-box for dispensing litter over said side wall and into said bed of said litter-box, said litter dispensing hopper further comprising: a bottom wall and a plurality of interconnected side walls forming an interior, said hopper adapted to stand on one of said side walls for dispensing litter into said bed; means providing a plurality of compartments in said interior, each compartment having an apex located adjacent the center of said interior and each compartment adapted to store a quantity of litter; a lid on said hopper for preventing spillage of the litter from said compartments, said lid including a central aperture; a gate carried by said hopper and closing said central aperture in said lid, said gate including a first member rotatably mounted in said central aperture of said lid and having a dispensing aperture adapted to be manually placed in communication with the apex of a selected compartment from which litter is to be dispensed, and a second member rotatably mounted adjacent said first member having a discharge aperture adapted to be manually placed in a first position wherein said discharge aperture is aligned with said discharge aperture of said second member whereby litter in said selected compartment is dispensed under gravity over said side wall and into said bed, and a second position wherein said dispensing aperture of said first member is not aligned with said aperture of said second member and said gate is closed.

10. The apparatus of claim 9, wherein said first and second members comprise first and second rotatable and concentric disks, said disks being disposed adjacent to each other, said first disk being manually rotatable for placing said dispensing aperture thereof in communication with the apex of said selected compartment and said second disk being manually rotatable for moving said dispensing aperture thereof between said first and second positions.

11. The apparatus of claim 10, wherein one of said first and second disks has a groove and the other of said first and second disks has a boss riding in said groove to limit relative rotation of said first and second disks to said first and second positions.

12. The apparatus of claim 10, further comprising a spout secured to said second disk beneath said aperture to allow directional control of the litter from the selected compartment into said bed.

13. The apparatus of claim 10 wherein said first and second disks are located adjacent one another to provide an inner disk and an outer disk, the inner disk being larger than the outer disk, said apparatus further comprising a removable lock pin for removably coupling said inner and outer disks t said bottom wall of said hopper.

14. The apparatus of claim 13 wherein said bottom wall of said hopper is characterized as having a generally flat peripheral portion and a plurality of inclined portions extending generally inwardly and toward the center of said hopper from said peripheral portion of said back wall to define a recess, said locking pin extending into said recess and being accessible through said recess for releasing the same in removing said first and second disks from said hopper, whereby said hopper, when empty, may be placed on said back wall and all of said compartments may be filled through said central opening in the lid of said hopper when said gate is removed therefrom, said gate being replaceable by placing said first and second disks and said lock pin in place.

15. The apparatus of claim 14 wherein said inner disk further comprises visible indicia for orienting the dispensing aperture thereof to communicate with the apex of the compartment placed in the uppermost position, said outer disk further comprising indicia for indicating that the outer disk is placed in one of said first and second positions wherein said gate is respectively opened and closed through alignment and misalignment of the dispensing apertures of said disks.

16. The apparatus of claim 9, wherein each of said compartments have a bottom surface inclined from the bottom wall of said hopper at an angle approximately equal to the angle of repose of the litter in said compartments.

17. The apparatus of claim 9, wherein said hopper has four triangular compartments.

18. The apparatus of claim 9, wherein each of said compartments includes an edge in contact with said gate and said lid, said edges being sharpened to prevent wedging of the litter between said gate and said compartments and between said lid and said compartments.

19. The apparatus of claim 9 wherein said hopper side walls are arranged in a generally square shape and adjacent side walls are joined by rounded corners to facilitate rolling said hopper from resting on one side wall to another.

* * * * *